United States Patent [19]

Tanguy

[11] 4,156,887
[45] May 29, 1979

[54] HEAT-SENSITIVE CAPACITOR

[75] Inventor: Jean Tanguy, Athis-Mons, France

[73] Assignee: Commissariat a l'Energie Atomique, Paris, France

[21] Appl. No.: 786,786

[22] Filed: Apr. 12, 1977

[30] Foreign Application Priority Data

Apr. 13, 1976 [FR] France ................................ 76 10861
Mar. 21, 1977 [FR] France ................................ 77 08385

[51] Int. Cl.² .............................................. H01G 4/06
[52] U.S. Cl. ..................................... 361/273; 252/63; 252/63.7; 252/66; 361/323
[58] Field of Search .................. 361/323, 273; 252/63, 252/63.2, 63.7, 66

[56] References Cited

U.S. PATENT DOCUMENTS

| | | | |
|---|---|---|---|
| 3,619,259 | 11/1971 | Wright | 361/323 |
| 3,851,363 | 12/1974 | Booe | 361/323 |
| 3,891,901 | 6/1975 | Booe | 361/323 |
| 3,955,127 | 5/1976 | Hunt | 361/323 |

Primary Examiner—Leland A. Sebastian
Assistant Examiner—J. L. Barr
Attorney, Agent, or Firm—Lane, Aitken & Ziems

[57] ABSTRACT

The invention relates to a heat-sensitive capacitor comprising a layer of dielectric material inserted between two metal electrodes.

According to the invention the dielectric material is made up of molecules of an organic compound comprising at least one aliphatic chain of at least 6 carbon atoms and at lest one heterocyclic group comprising a nitrogen atom, at least some of the molecules being bonded to anions, the organic compound also having a reversible phase transition at a given temperature.

The invention also comprises a method of manufacturing such a capacitor whereby the organic compound is deposited on a metal substrate to form a thin layer having a desired thickness, a metal coating being then formed on the deposited layer and the resulting assembly being heat-treated at a temperature above the phase transition temperature of the compound.

11 Claims, 12 Drawing Figures

HEAT-SENSITIVE CAPACITOR

The invention relates to a heat-sensitive capacitor and a method of making it.

More specifically, it relates to a heat-sensitive capacitor comprising an organic dielectric material which is of such a nature that, when subjected to temperature changes around a given temperature, it produces considerable variations in the capacitance and conductance of the capacitor.

The heat-sensitive capacitor according to the invention comprises two metal electrodes between which a layer of dielectric material is inserted and is characterised in that the dielectric material is made up of molecules of an organic compound comprising at least one aliphatic chain of at least 6 carbon atoms and at least one heterocyclic group comprising a nitrogen atom, at least some of the molecules being bonded to anions, the organic compound also having a reversible phase transition at a given temperature.

The capacitor of the previously-defined kind makes advantageous use of the fact that, near the phase transition temperature of a dielectric material of the aforementioned kind, the dielectric constant of the material varies in dependence on the temperature, resulting in considerable variations in the capacitance of the capacitor. This special property of the dielectric material is mainly due to the fact that its phase transition, which corresponds to a modification in the structure of the aliphatic chain containing at least 6 carbon atoms, results in a considerable increase in the mobility of the anions in its structure, thus producing considerable variations in the capacitance of the capacitor.

In a first embodiment of the invention, the molecules bonded to anions are ionic complexes of the compound. The following are examples of organic compounds for use in the first embodiment: 4,7-diheptadecyl 5-octadecyl oxy 1,10-phenanthroline having the following formula:

i.e. orthophenanthroline on to which three stearic chains have been grafted, the compound hereinafter being referred to as OP3; 4-heptadecyl 6-octadecyl oxy 8-amino quinoleine having the formula:

and 4-heptadecyl 1-pyridine, having the formula:

In the first embodiment, the ionic complexes are obtained by fixation of ionic compounds on to the organic compound, the ionic compounds preferably being chosen from the group comprising hydrochloric acid and aluminium hydroxide.

A capacitor corresponding to the first embodiment is manufactured by depositing the compound on to a metal substrate to form a thin layer having the desired thickness, which is then coated with metal and the resulting assembly is heat-treated at a temperature above the phase transition temperature of the compound, a voltage being applied to the capacitor if required during the heat treatment.

Advantageously the compound is 4,7-diheptadecyl 5-octadecyl oxy 1,10-phenanthroline, the metal is aluminium and the heat-treatment is carried out at a temperature over 35° C., during which a voltage between 1 and 2 V is applied to the capacitor and then progressively increased to 4 volts for a time less than 1 minute.

In a variant of the method, a given proportion of the ionic complex of the compound is deposited on to the metal substrate and the resulting capacitor is additionally heat-treated in vacuo at a temperature above 100° C. for a time of less than 24 hours.

In a second embodiment of the invention, all the molecules of the dielectric are bonded to anions and the dielectric material is made up of molecules of a quaternary ammonium salt comprising at least one heterocyclic group containing a nitrogen atom, the salt also having a reversible phase transition at a given temperature.

As is known, a quaternary ammonium salt has the formula:

in which $X^-$ denotes an anion and $R_1$, $R_2$, $R_3$ and $R_4$ denote organic radicals and in which two radicals $R_1$, $R_2$, $R_3$ and $R_4$ may together form a cyclic group and be replaced by a single divalent radical.

According to the invention, the ammonium salts used are formed from cyclic amines and correspond to the case where $R_1$ and $R_2$ are replaced by a single divalent radical which also combines with $R_3$ to form a cyclic group R₄ which is preferably an aliphatic chain of at least 6 carbon atoms.

In the second embodiment, the dielectric material is advantageously a quaternary ammonium salt taken from the group comprising pyridinium halides and bipyridinium halides. The following are examples of such substances:

an N-alkyl pyridinium iodide having the formula:

in which n is an integer between 6 and 22;

an N-alkyl-2-2' bipyridinium iodide having the formula:

in which n is an integer between 6 and 22, and an N-alkyl pyridinium chloride having the formula:

in which n is an integer between 6 and 22.

A heat-sensitive capacitor corresponding to the second embodiment is manufactured by depositing the quaternary ammonium salt on a metal substrate to form a thin layer having the desired thickness, the thus-deposited layer being coated with metal and the resulting assembly being heat-treated at a temperature above the phase transition temperature of the salt.

In certain cases, it is also advantageous to apply a voltage to the resulting assembly during the heat-treatment.

The invention will be more clearly understood from the following description which is given by way of non-limitative example, with reference to the accompanying drawings in which.

A non-limitative example of compounds suitable for the first embodiment of the invention is orthophenanthroline on to which three stearic chains have been granted, i.e. orthophenanthroline OP₃(I). Its structure meets the criteria of the invention—i.e. it has two heterocyclic groups comprising a nitrogen atom and three long saturated aliphatic chains which are of such a nature that, at a temperature of 35° C., the compound has a reversible phase transition, probably due to the change in the structure of the long stearic chains.

The compound has polar groups adapted to fix cations, e.g. of copper, aluminium zinc or hydrogen, and can thus form ionic complexes by fixing ionic compounds in which the anion is e.g. $SO_4^=$, $Cl^-$ or $OH^-$. In these complexes, the anions are weakly bonded to the polar groups of the molecyles of orthophenanthroline OP₃ and, when acted upon by an electric field, they may move inside the dielectric structure, the transition of the ions from one adjacent region to another forming a potential barrier to the movement of ions. In order to obtain short relaxation times, the ions should be small, e.g. $Cl^-$ or $OH^-$, since the latter are driven more quickly.

When the dielectric layer is heated near the transition temperature, the phase change, due probably to expansion of the stearic chains, reduces the height of the potential barriers, resulting in a rapid change in the mobility of the ions, shown by a considerable variation in the dielectric constant of the material. These variations have been found in a temperature range of about 10° C. around the transition point, i.e. in the case of orthophenanthroline OP₃, in a temperature range between 25° C. and 45° C.

Since the transition temperature is related to the length of the aliphatic chains, the aforementioned variations are obtained at around 35° C. for an 10 C chain, around 52° for a 24 C chain, and at temperatures below 35° C. for chains containing less then 18 carbon atoms.

A capacitor having a dielectric based on orthophenanthroline OP₃ is manufactured as follows:

In a first step of the method, the layer of orthophenanthroline OP$_3$ is deposited on an insulating substrate covered with a thin layer of metal for forming the first electrode of the capacitor. By way of example, the substrates used are smooth glass, mylar or mica substrates, covered e.g. by vaporisation of aluminium or any other metal adapted to form a thin layer of insulating oxide.

The OP$_3$ molecules are deposited either by the Langmuir-Blodgett method or by direct deposition on the substrate of an OP$_3$ solution in a volatile solvent, followed by evaporation of the solvent, or by other methods for forming regular layers of controlled thickness, e.g. by evaporation of powders in vacuo or by electrochemical methods.

In the Langmuir-Blodgett method, a regular, compressible mono-molecular layer is formed on the surface of a liquid such as water, starting from a mixture of molecules of orthophenanthroline OP$_3$ and of stearic acid or alpha-hydroxystearic acid molecules in the proportion of one molecule of orthophenanthroline OP$_3$ per 3 molecules of stearic or alpha-hydroxystearic acid, the latter molecules being incorporated in the mixture for the sole purpose of facilitating the formation of a compressible film. In this manner, a compact film is obtained on the surface of the water and transferred to the aluminium-coated solid substrate. To obtain the desired thickness of dielectric, a number of successive transfers are made in certain cases, e.g. 100 transfers to obtain a thickness of 2500 Å, which corresponds to 100 superposed monomolecular layers.

In the direct deposition method, a solution of orthophenanthroline OP$_3$ in a volatile solvent such as benzene or chloroform is deposited on to the substrate, the concentration of orthophenanthroline OP$_3$ in the solution being of the order of $10^{-3}$ mol per liter. Next, the solvent is evaporated at ambient temperature to obtain a regular film of orthophenenthroline OP$_3$ on the substrate. The operation is repeated as often as necessary for the dielectric layer to have the desired thickness. The resulting layers have a thickness between 500 Å and 1 micron.

In a second step of the method, the thus-deposited layer is coated with metal for forming a second electrode of the capacitor. When the metal is aluminium, for example, the coating is applied by vaporisation.

In a third step of the method, the resulting capacitor is heat-treated so as to reorganise and stabilise the structure of the layer. The treatment consists in heating the capacitor to a temperature at least equal to the phase transition temperature of the compound used, e.g. to approximately 35° C. in the case of orthophenanthroline OP$_3$, to ensure the final reorganisation of the molecules. During the reorganisation, weak points may appear in certain places on the dielectric and produce a short-circuit of the capacitor by the formation of contacts between the two electrodes and the weak points.

In that case, a voltage is applied to the capacitor during heat-treatment so as to eliminate any contacts formed between the two electrodes. In the case of orthophenanthroline OP$_3$, a voltage between 1 and 2 V through a resistance of less than 100 Ohms is applied to the capacitor electrodes for a few seconds, then progressively raised to 4 V for a few seconds to complete the treatment. Under these conditions, when the electrodes are made of aluminium, any aluminium contacts formed are vaporised by the current travelling through them. This eliminates any short-circuits inside the capacitor.

At the end of the treatment the dielectric structure is completely stabilised and the capacitor has the required properties for producing considerable variations in its capacity and conductance when its temperature is brought near 35° C. In addition, the capacitor can permanently withstand a measuring voltage of the order of 1 V in a wide temperature range, and thus be used for very accurate measurement of temperatures around 35° C.

The resulting dielectric structure comprises ionic complexes of orthophenanthroline OP$_3$, probably formed during the heat treatment by displacement of some ions coming from the alumina layer formed naturally on the aluminium electrode surface, or by certain ions present in the form of impurities in the OP$_3$ molecules.

In some cases, however, it is preferable to add a given proportion of molecules of ionic complexes of orthophenanthroline OP$_3$ during the deposition of the dielectric layer. Preferably, at the time of deposition, 9 molecules of orthophenanthroline OP$_3$ are introduced per molecule of ionic complex, i.e. per molecule of orthophenanthroline OP$_3$ on to which a molecule of hydrochloric acid or a molecule of aluminium hydroxide has been fixed. Under these conditions, the temperature for reorganising the structure of the dielectric depends closely on the degree of chelation of the molecules. Advantageously, to obtain the final characteristics of the capacitor in stable form, additional heat treatment is given after the heat treatment under voltage.

The additional treatment consists in heating the capacitor in vacuo to a temperature above 100° C., e.g. 130° C., for about 2 hours, in the case of orthophenanthroline OP$_3$ containing 10% of chelated molecules. The resulting capacitor has the desired electric characteristics. In the temperature range of about 10° around 35° C., the capacitance of the capacitor varies by a factor of 10 and its conductance by a factor of 1000. The proportion of optionally chelated molecules can be considerably increased, but in this case the additional heat-treatment must be correspondingly prolonged, up to approximately 24 hours when all the molecules are chelated.

FIGS. 1, 2, 3 4 illustrate the properties of a capacitor comprising two aluminium electrodes between which a layer of molecules of orthophenanthroline OP$_3$ and of ionic complexes of orthophenanthroline OP$_3$ has been inserted.

Figure 1:
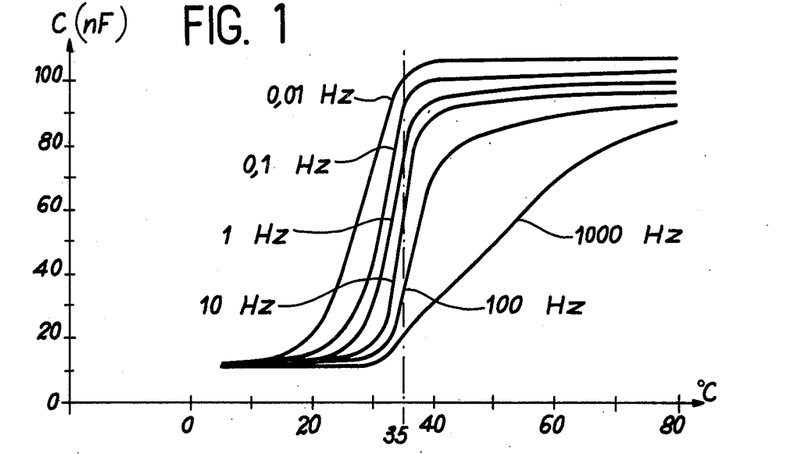
FIG. 1 is a diagram showing the variations with temperature in the parallel capacitance of a capacitor.

As shown in FIG. 1, the parallel capacitance of the aforementioned capacitor increases considerably between 20° and 40° C., and the amplitude of the variation also depends on the frequency of the current applied to the capacitor electrodes.

Figure 2:
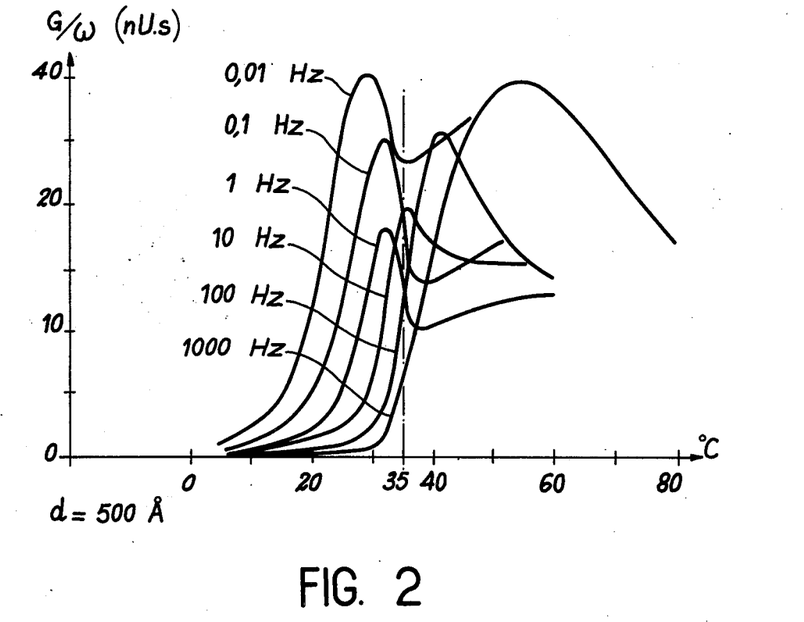
FIG. 2 is a diagram showing the variations with temperature of the parallel conductance of a capacitor.

FIG. 2 shows that the parallel conductance of the capacitor likewise varies considerably in a temperature range around 35° C. and that the amplitude of the maxima varies with the frequency of the current applied to the capacitor electrodes.

Figure 3:
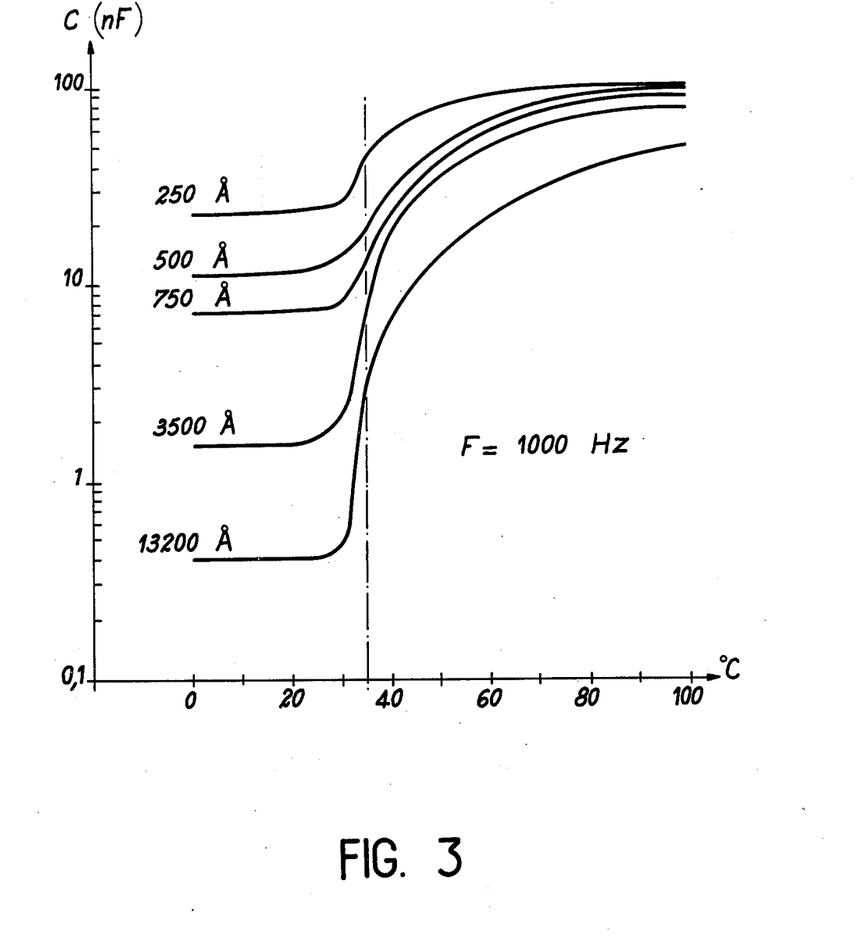
FIG. 3 is a diagram showing the variations with temperature in the parallel capacitance of a capacitor, for various thicknesses of dielectric.
Figure 4:
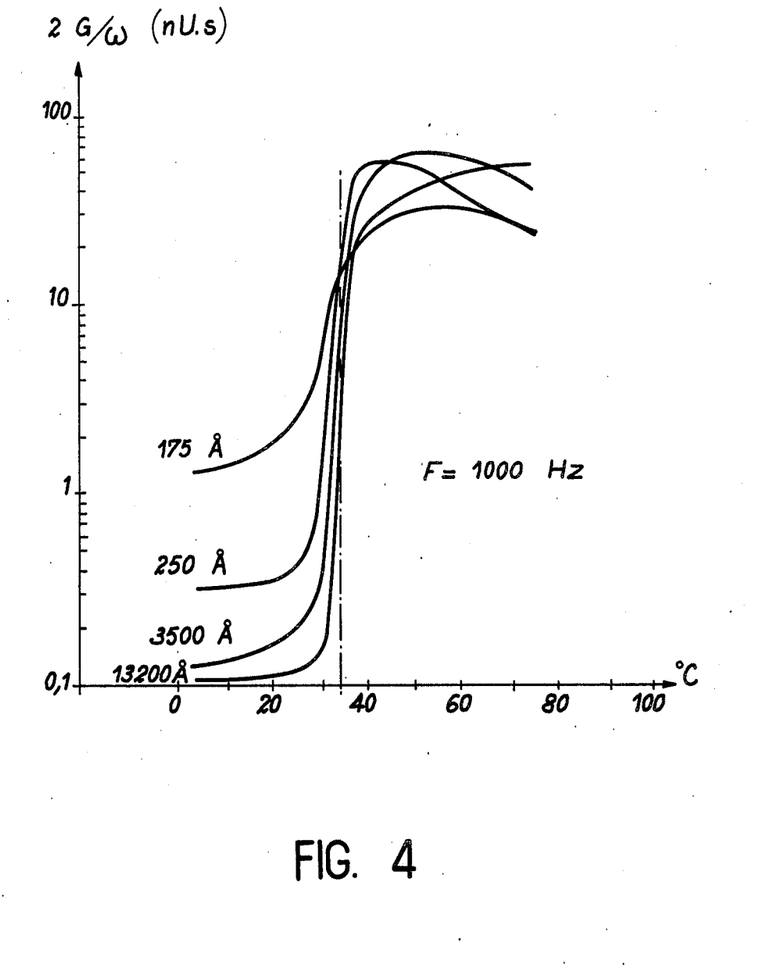
FIG. 4 is a diagram showing the variations with temperature in the parallel conductance of a capacitor for various thicknesses of dielectric.

In FIGS. 3 and 4, it can be seen that the capacitance of the capacitor varies to a relatively large extent with the thickness of the dielectric layer, and that the greatest variation in capacitance corresponds to the greatest thickness studied, i.e. 13,200 Å, with an a.c. current at a frequency of 1000 Hz. Similarly, the parallel conductance of the capacitor varies relatively considerably with the thickness of the dielectric layer, and as before the greatest variation corresponds to the greatest thickness studied, i.e. a thickness of 13,200 Å at a current frequency of about 1000 Hz.

We shall now describe other heat-sensitive capacitors which correspond to the second embodiment of the invention, i.e. capacitors in which the dielectric is a quaternary ammonium salt such as an N-alkyl-pyridinium iodide in which the alkyl group contains 6, 10, 14, 18 or 22 carbon atoms.

The phase transition temperature of the N-alkyl pyridinium iodide depends on the length of the alkyl group and varies from 58° C. for a $C_6$ alkyl group to 102° C. for a $C_{22}$ alkyl group. The following Table indicates the phase transition temperatures corresponding to the aforementioned dielectric materials in dependence on the number of carbon atoms in the alkyl group.

| n = 6 | n = 10 | n = 14 | n = 18 | n = 22 |
| --- | --- | --- | --- | --- |
| 58° C. | 70° C. | 82° C. | 96° C. | 102° C. |

These capacitors are manufactured as follows.

A layer of N-alkyl pyridinium iodide having a thickness between 500 and 10,000 Å is deposited on to a metal substrate made e.g. of aluminium and forming the first capacitor electrode. Next, the thus-deposited layer is coated with metal, e.g. aluminium, to form the second capacitor electrode and the resulting assembly is heat-treated at a temperature above the phase transition temperature of the N-alkyl pyridinium iodide used.

During the heat-treatment, weak points may appear at certain places on the dielectric and thus short-circuit the capacitor by forming a contact between the two electrodes at the weak point. In that case, a voltage is applied to the capacitor during the heat-treatment in order to eliminate any contacts formed between the two electrodes. This is done e.g. by applying a voltage between 1 and 2 V through a resistance less than 100 Ohms to the capacitor electrodes for a few seconds and by then progressively increasing the voltage to 4 V for a few seconds to complete the treatment.

N-alkyl-pyridinium can be deposited by direct deposition of a solution of N-alkyl-pyridinium iodide in a volatile solvent on to the substrate, followed by evaporation of the solvent, or by other methods for obtaining regular layers having a controlled thickness, e.g. by evaporation of powders in vacuo or by electrochemical methods.

Figure 5:
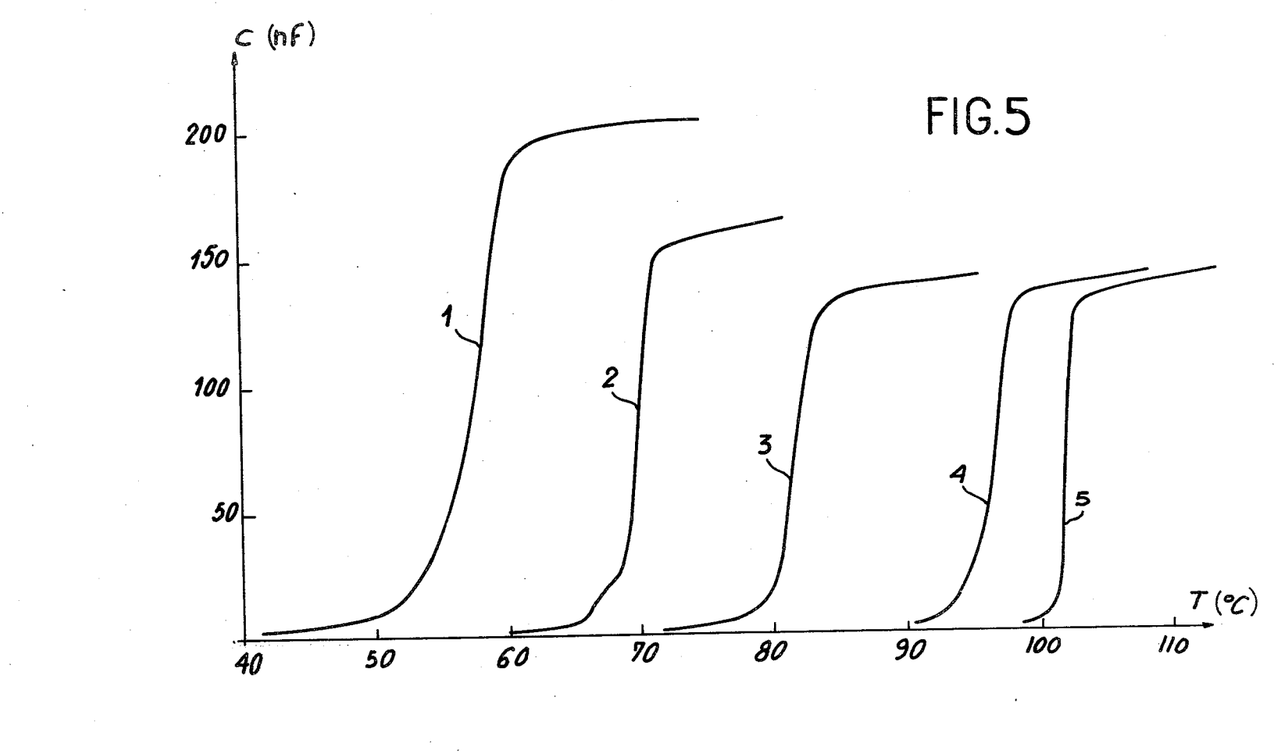
FIG. 5 is a diagram showing the variations with temperature, at a frequency of 1 kHz, in the capacitance of various capacitors according to the invention.
Figure 6:
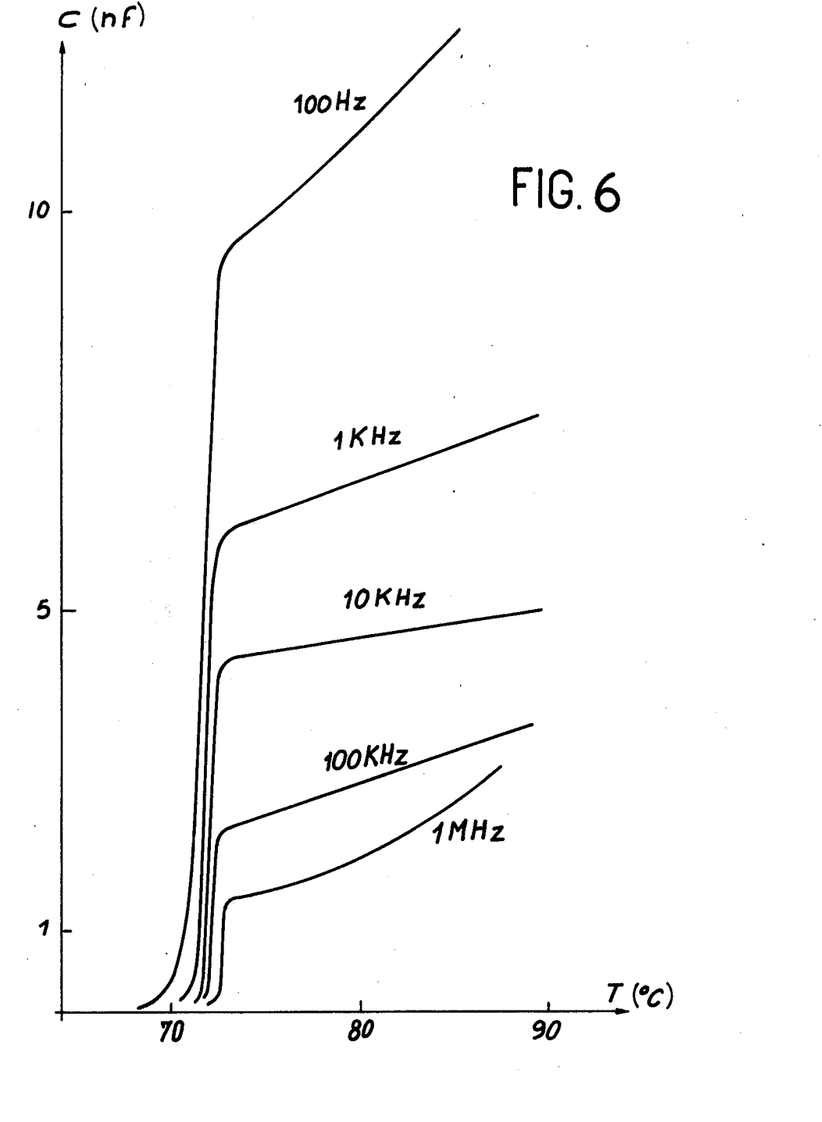
FIG. 6 is a diagram showing the variations with temperature, at different frequencies, of the capacitance of a capacitor according to the invention in which the dielectric material is N-decyl-pyridinium iodide.

The special properties of the resulting capacitors are illustrated in FIGS. 5 and 6.

FIG. 5 shows that the capacitance (in nF) of the resulting capacitors varies considerably with temperature, when the temperature is near the phase transition point of the dielectric material.

The curves in FIG. 5 were prepared for capacitors having an area of 25 mm², comprising a layer of dielectric 200 Å thick between two aluminium electrodes and subjected to an a.c. electric current at a frequency of 1 kHz, and the curves correspond to capacitors in which the dielectric material consisting of an N-alkyl pyridinium iodide varies with regard to the number n of carbon atoms in the alkyl group. Curves 1, 2, 3, 4 and 5 correspond to n=16, 10, 14, 18 and 22 respectively.

As shown in FIG. 6, the variations in capacitance (in nF) with temperature (in 1° C.) of a capacitor according to the invention having an area of 1 mm² and in which the dielectric is N-decyl pyridinium iodide, having amplitudes which vary with the frequency of the electric current applied to the capacitor electrodes. The curves illustrated in FIG. 6 correspond to frequencies of 100 Hz, 1 kHz, 10 kHz, 100 kHz and 1 MHz respectively. As can be seen, the variation in the capacitance of the capacitor is perceptible even at electric frequencies above 100 kHz.

The possibility of detecting variations in capacitance at high frequencies is an important advantage of these capacitors. They have numerous applications, for example for measuring temperatures, and in this application the use of high frequencies can increase the accuracy of the measurement by improving the signal/noise ratio.

Figure 7:
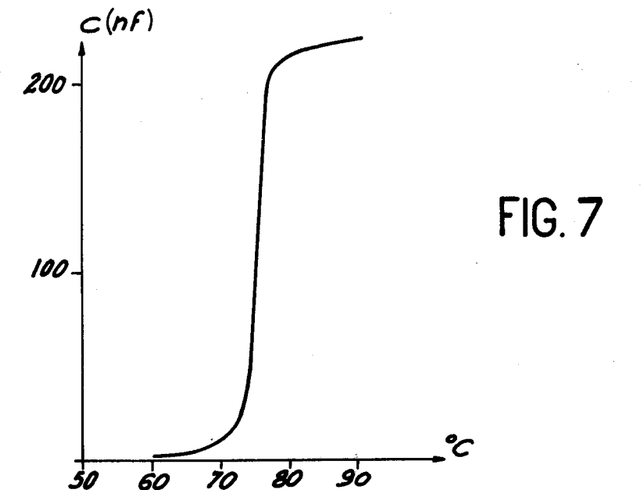
FIG. 7 is a diagram showing the variations in the capacitance of a capacitor according to the invention in which the dielectric material is N-octadecyl-pyridinium chloride.

As FIG. 7 shows, the capacitance (in nF) of a capacitor having an area of 25 mm² subjected to an a.c. of 1 kHz and in which the dielectric material is a 2000 Å thick layer of N-octadecyl pyridinium chloride varies considerably with temperature (in ° C.) around 75° C.

Figure 8:
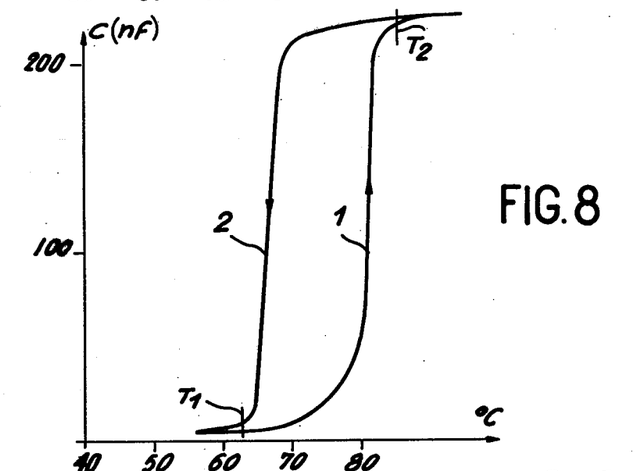
FIG. 8 is a diagram showing two curves representing the variations with temperature of the capacitance of a capacitor according to the invention, the two curves respectively corresponding to an increase in temperature above the phase transition temperature of the dielectric material and to a decrease in the temperature from a temperature which is above the phase transition point of the dielectric material.

Referring to FIG. 8, it will be seen that the values of the capacitance, in dependence on temperature, of a capacitor corresponding to the second embodiment of the invention are substantially different depending on whether the capacitor temperature is raised from a temperature below the phase transition temperature of the dielectric material (curve 1) or lowered from a temperature above the transition phase temperature (curve 2).

The curves were prepared at a frequency of 1 kHz using a capacitor in which the dielectric material was N-tetradecyl pyridinium iodide.

Curve (1) corresponds to the dielectric phase transition, i.e. to the changes of the dielectric material from the crystalline state to the amorphous state. Curve (2) corresponds to the return of the dielectric material from the amorphous state to the crystalline state.

Thus, the capacitor has hysteresis, the amplitude of which depends on the variation in temperature. The hysteresis is due to the fact that there is a certain delay in the return of the dielectric material from the amorphous to the crystalline state.

Consequently, the perceptible variations in the capacitance occur between two temperatures $T_1$ and $T_2$ corresponding to 64° C. and 82° C. respectively.

The hysteresis may advantageously be used for regulating the temperature of a medium between two given thresholds corresponding to the temperature $T_1$ and $T_2$ of the hysteresis cycle.

However, the hysteresis disappears if the capacitor temperature always remains slightly below the phase transition temperature of the dielectric material. Consequently, heat-sensitive capacitors corresponding to the second embodiment of the invention can be used to measure temperatures which increase or decrease in a range below the phase transition temperature of the dielectric material. However, the capacitors may also be used to measure the temperature of a medium over a wider range of temperatures when the direction in which the temperature of the medium varies is known.

Figure 9:
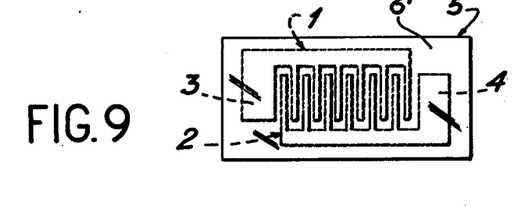
FIG. 9 shows a variant embodiment of a heat-sensitive capacitor according to the invention.

FIG. 9 shows a variant embodiment of a capacitor according to the invention in which the dielectric is a quaternary ammonium salt.

In this variant, the metal electrodes are a metal grid in two isolated comb-shaped parts 1 and 2 disposed so that the teeth of comb 1 are disposed between the teeth of comb 2.

Combs 1 and 2 are connected by contacts 3 and 4 to an electric power source and are supported by an insulating substrate 5 e.g. of glass, ceramics or plastics. The assembly formed by substrate 5 and combs 1 and 2 is covered with a layer 6 of dielectric material. In this case, the total capacitance of the capacitor, both in the conducting and in the insulating state, depends on the number of teeth and the spacing between them.

In order to obtain a high capacitance, comparable with that of a capacitor containing two superposed electrodes, i.e. of the order of 200 to 300 nF, the width of each tooth and the spacing between them are of the order of 10 microns. Thus, a capacitor having two combs with a total of 500 teeth on an area of 1 cm² and a 2000 Å thick layer of N-decyl-pyridinium iodide has a capacitance of the order of 100 nF in the conductive state.

A capacitor of this kind is manufactured by depositing the quaternary ammonium salt on to an insulating substrate covered with a metal grid in two isolated parts, the resulting capacitor being heat-treated at a temperature above the phase transition point of the salt.

The structure of the capacitor is such as practically to eliminate any possible short-circuits due to the formation of contacts between the two electrodes. Subsequently, there is no need to apply a voltage to the capacitor during the heat-treatment.

The capacitors according to the invention have numerous applications, for example for very accurate measurement of temperatures near the dielectric transition temperature, and for detecting infrared radiation.

Figure 10:
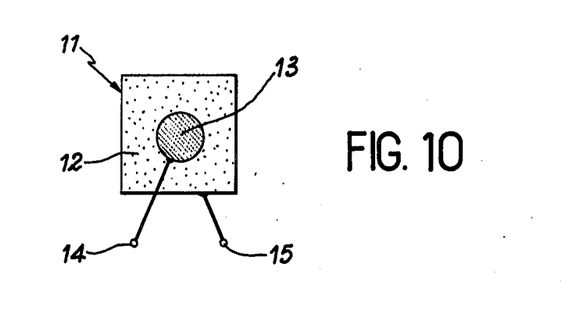
FIG. 10 is a diagram of a device for measuring the temperature of a surface, using a capacitor according to the invention.

FIG. 10 shows a first embodiment of a thermometer for measuring the temperature of a surface. The thermometer comprises a first electrode 11 comprising a thin aluminium sheet or an aluminium-coated substrate having an area of e.g. 1 cm². The first electrode is coated with a layer 12 of orthoplenanthroline OP₃, obtained by depositing a drop of orthophenanthroline OP₃ dissolved in a volatile solvent and by evaporating the solvent. A second aluminium electrode 13 having an area less than the first electrode 11, e.g. between 1 and 25 cm², is deposited on the layer of dielectric. The contacts on the two electrodes are via two gold wires 14, 15 stuck to the electrodes by a silver adhesive. The two contact wires are connected to a capacitance-measuring bridge or any other electronic device. After the thermometer has been calibrated, temperatures can be very accurately determined in a range between 25° and 45° C. by measuring the capacitance or conductance of the capacitor. The obtainable accuracy is of the order of a thousandth of a degree near 35° C.

Figure 11:
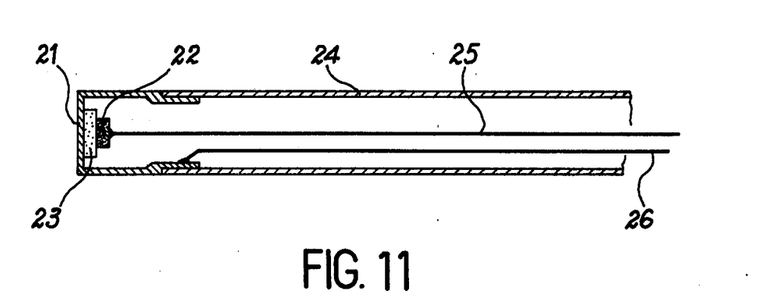
FIG. 11 is a diagram of a thermometer using the capacitor according to the invention.

FIG. 11 illustrates a second embodiment of a thermometer in which the capacitor comprises a first aluminium electrode 21, and a second aluminium electrode 22 between which a layer of dielectric based on orthophenanthroline OP₃ is inserted. The capacitor is disposed in a tubular probe 24 having a small diameter, of the order of approximately 3 mm, advantageously of stainless steel. The two aluminium electrodes are secured by a silver adhesive to two gold wires 25 and 26. As before, the temperature can be determined by measuring the capacitance or conductance of the capacitor, using a capacitance-measuring bridge or any other electronic device.

Figure 12:
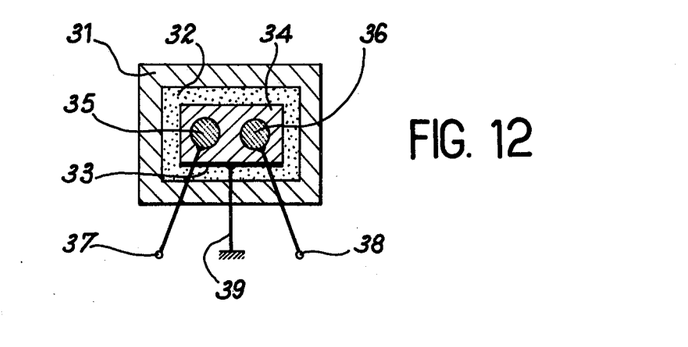
FIG. 12 is a diagram of an infrared radiation detector using the capacitor according to the invention.

FIG. 12 shows an infrared radiation detecting device comprising a capacitor according to the invention. The device comprises a rigid frame 31 made of a material which is a good conductor of heat, e.g. copper or aluminium. A thin plastics film 32 having a thickness of the order of a micron, and made e.g. of Teflon, mylar or any other material having low heat inertia, is stretched on the rigid frame 31. The film is coated with aluminium over nearly all its surface except for its edge, to avoid contact between the aluminium and the rigid frame 31. Thus, the aluminium deposit forms the lower electrode 33 of the device. A layer 34 of orthophenanthroline OP₃ molecules is deposited by the direct-deposition method over the entire surface of the electrode. At two distinct places, the dielectric layer 34 is coated with aluminium, thus forming two independent contacts 35, 36 which form the two upper electrodes of the device. Contact wires 37, 38, 39 are secured to the top electrodes 35, 36 and to the bottom electrode 33 respectively. The contact wires 37, 38, 39 are connected to a capacitance-measuring bridge or any other electronic device for measuring the difference in impedance between the two top electrodes 35 and 36.

In order to detect infrared radiation, the assembly is placed on a solid metal support having a temperature adjusted to approximately the transition temperature, e.g. at a temperature near 35° C. in the case of a dielectric based on orthophenanthroline OP₃, or at a temperature slightly below the phase transition temperature of the dielectric when the latter is a wuaternary ammonium salt, e.g. a pyridinium or bipyridinium halide. Under these conditions, when only one of the top electrodes of the device is subjected to infrared radiation, the capacitance-measuring device records a difference in impedance between the two top electrodes and thus, after the device has been calibrated, it is possible to determine the variations in the temperature of the electrode irradiated by infra-red radiation. When the measurement is made, it is sometimes preferable to mask the electrode which must not be acted upon by the infrared radiation.

To improve the absorption of radiation, the top electrodes 35, 36 are covered with a black substance, e.g. gold black.

The device can detect extremely low infrared fluxes and its accuracy is comparable with that of conventional Golay-type detectors.

The aforementioned thermometer and infrared radiation detection devices have numerous advantages, mainly their ease of manufacture, their small bulk, their ease of operation and the possibility of obtaining large useful areas by means of the device.

In addition, owing to their properties, the heat-sensitive capacitors according to the invention are well suited for detecting a temperature threshold and may with particular advantage be used in heating or fire detectors.

I claim:

1. A heat sensitive capacitor comprising two metal electrodes and a layer of dielectric material inserted between said electrodes, said dielectric material comprising molecules of an organic compound comprising at least one aliphatic chain of at least 6 carbon atoms and at least one heterocyclic group containing a nitrogen atom, and molecules of an ionic complex of the organic compound, said organic compound having a reversible phase transition at a given temperature and being selected from the group consisting of (a) 4,7-diheptadecyl-5-octadecyl-oxy-1,10-phenanthroline having the following formula:

(b) 4-heptadecyl-6-octadecyl-oxy-8-amino quinoleine having the formula:

and (c) 4-heptadecyl-1-pyridine having the formula:

2. A capacitor according to claim 1, wherein the organic compound is 4,7-diheptadecyl-5-octadecyl-oxy-1,10-phenanthroline having the following formula:

3. A capacitor according to claim 1, wherein the ionic complex of the organic compound is the organic compound and an ionic compound fixed thereto, said ionic compound being chosen from the group comprising hydrochloric acid and aluminum hydroxide.

4. A capacitor according to claim 1, wherein the electrodes are of aluminium or of a metal suitable for forming a thin layer of insulating oxide.

5. A heat sensitive capacitor comprising two metal electrodes and a layer of dielectric material inserted between said electrodes, said dielectric material comprising molecules of an organic quaternary ammonium salt comprising at least one aliphatic chain of at least 6 carbon atoms and at least one heterocyclic group containing a nitrogen atom, said salt having a reversible phase transition at a given temperature and being selected from the group consisting of pyridinium halides and bipyridinium halides.

6. A capacitor according to claim 5, wherein the dielectric material is an N-alkyl pyridinium iodide having the following formula:

in which n is an integer between 6 and 22.

7. A capacitor according to claim 5, wherein the dielectric material is an N-alkyl 2,2'-bipyridinium iodide having the following formula:

in which n is an integer between 6 and 22.

8. A capacitor according to claim 5, wherein the dielectric material is an N-alkyl,-pyridinium chloride having the following formula:

9. A capacitor according to claim 5, wherein the electrodes are of aluminum or of a metal suitable for forming a thin layer of insulating oxide.

10. The use of the heat sensitive capacitor of claim 1 for constructing devices for measuring the temperature near the aforementioned transition temperature.

11. The use of the heat-sensitive capacitor of claim 1 for constructing infrared radiation detectors.

* * * * *